US011345473B1

(12) United States Patent
Liberko et al.

(10) Patent No.: US 11,345,473 B1
(45) Date of Patent: May 31, 2022

(54) SYSTEM AND METHOD FOR PREVENTING INADVERTENT LOSS OF SURVEILLANCE COVERAGE FOR AN UNMANNED AERIAL SYSTEM (UAS)

(71) Applicant: Rockwell Collins, Inc., Cedar Rapids, IA (US)

(72) Inventors: Nicholas Liberko, Marion, IA (US); Boe A. Svatek, Cedar Rapids, IA (US); Kevin McElroy, Vint Hill Farms, VA (US); David Fogerty, Marion, IA (US); Brian R Wolford, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 61 days.

(21) Appl. No.: 17/067,431

(22) Filed: Oct. 9, 2020

Related U.S. Application Data

(63) Continuation-in-part of application No. 16/704,742, filed on Dec. 5, 2019.

(51) Int. Cl.
*G08G 5/00* (2006.01)
*B64C 39/02* (2006.01)
(Continued)

(52) U.S. Cl.
CPC ............ *B64C 39/024* (2013.01); *B64D 45/00* (2013.01); *G05D 1/106* (2019.05); *G08G 5/0013* (2013.01);
(Continued)

(58) Field of Classification Search
CPC .. G08G 5/0013; G08G 5/0021; G08G 5/0026; G08G 5/0039; G08G 5/0052; G08G 5/0069; G05D 1/0022; G05D 1/106
See application file for complete search history.

(56) References Cited

U.S. PATENT DOCUMENTS 5,111,400 A * 5/1992 Yoder .................... G01S 13/91
342/36
6,044,323 A * 3/2000 Yee .................... H04B 7/18508
701/13
(Continued)

FOREIGN PATENT DOCUMENTS

GB 2569789 A 7/2019
WO 2018178759 A1 10/2018

OTHER PUBLICATIONS

Extended Search Report for European Application No. 20212277.6 dated Apr. 29, 2021, 5 pages.

*Primary Examiner* — Andrew W Bee
(74) *Attorney, Agent, or Firm* — Suiter Swantz pc llo (57) ABSTRACT

An unmanned aerial system (UAS) is disclosed. In embodiments, the UAS includes an unmanned aerial vehicle (UAV) and a controller communicatively coupled to the UAV. In embodiments, the UAS controller may be configured to: acquire a surveillance quality model for a prescribed flight path; generate one or more control signals configured to cause the UAV to perform a monitored flight along the prescribed flight path; acquire actual surveillance quality data during the monitored flight along the prescribed flight path; compare the actual surveillance quality data to the surveillance quality model; identify a surveillance quality deviation between the actual surveillance quality and the surveillance quality model; and generate one or more control signals configured to cause the UAV to perform one or more corrective actions or maneuvers if the identified surveillance quality deviation exceeds a threshold deviation value.

15 Claims, 5 Drawing Sheets

(51) Int. Cl.
    *G05D 1/10*     (2006.01)
    *B64D 45/00*    (2006.01)

(52) U.S. Cl.
    CPC ......... *G08G 5/0021* (2013.01); *G08G 5/0026* (2013.01); *G08G 5/0039* (2013.01); *G08G 5/0052* (2013.01); *G08G 5/0069* (2013.01); *B64C 2201/141* (2013.01); *B64D 2045/0085* (2013.01)

(56) References Cited

U.S. PATENT DOCUMENTS

| | | | |
|---|---|---|---|
| 8,600,602 B1 | 12/2013 | McAndrew et al. | |
| 8,798,922 B2 | 8/2014 | Tillotson et al. | |
| 9,273,981 B1 | 3/2016 | Downey et al. | |
| 9,715,235 B2 | 7/2017 | McGrew et al. | |
| 10,049,590 B2 | 8/2018 | Thiele et al. | |
| 10,421,543 B2 | 9/2019 | Liu et al. | |
| 10,438,494 B1 | 10/2019 | Hahn | |
| 10,466,700 B1 | 11/2019 | Carmack et al. | |
| 10,656,643 B1 | 5/2020 | Bertram et al. | |
| 2011/0231036 A1* | 9/2011 | Yogesha | G08G 5/0021 701/3 |
| 2015/0197010 A1 | 7/2015 | Ruuspakka et al. | |
| 2015/0339932 A1* | 11/2015 | Ramanna | G08G 5/0013 701/528 |
| 2016/0232795 A1 | 8/2016 | Thiele et al. | |
| 2017/0108866 A1 | 4/2017 | Quinn | |
| 2018/0267532 A1 | 9/2018 | Li et al. | |
| 2019/0043368 A1 | 2/2019 | Priest | |
| 2019/0265705 A1 | 8/2019 | Zhang et al. | |
| 2019/0315462 A1 | 10/2019 | Skladman et al. | |
| 2019/0315482 A1 | 10/2019 | Gu et al. | |
| 2020/0394927 A1 | 12/2020 | Neubauer et al. | |
| 2021/0053680 A1 | 2/2021 | Prest et al. | |
| 2021/0159971 A1* | 5/2021 | Panchai | H04B 7/1855 |

* cited by examiner

SYSTEM AND METHOD FOR PREVENTING INADVERTENT LOSS OF SURVEILLANCE COVERAGE FOR AN UNMANNED AERIAL SYSTEM (UAS)

CROSS-REFERENCE TO RELATED APPLICATIONS

The present application claims priority under 35 U.S.C. § 120 as a continuation-in-part of co-pending U.S. patent application Ser. No. 16/704,742, filed Dec. 5, 2019 and entitled SYSTEM AND METHOD FOR PREVENTING INADVERTENT LOSS OF COMMAND AND CONTROL LINK TO AN UNMANNED AERIAL SYSTEM. Said U.S. patent application Ser. No. 16/704,742 is herein incorporated by reference in its entirety.

BACKGROUND

Operating unmanned aerial vehicles (UAVs) beyond visual line of sight (BVLOS) requires continuous surveillance to ensure deconfliction (e.g., incursion, collision) from other proximate aircraft. Onboard surveillance can mitigate lower-density aircraft operations to an extent, but for higher-density operations a multilayered approach to surveillance may be best. While conventional approaches can monitor surveillance systems and ensure that they are operable, it is not possible to prevent inadvertent departure from surveillance coverage inflight. Currently, BVLOS operations require extensive preplanning taking into account expected surveillance coverage.

SUMMARY

An unmanned aircraft system (UAS) is disclosed. In embodiments, the UAS includes an unmanned aerial vehicle (UAV) and a UAS controller including control processors programmed to execute encoded instructions. The UAS controller acquires surveillance quality models (associated with, e.g., the ability of the UAV to both detect, and be detected by, proximate aircraft) for one or more portions or segments of a prescribed flight path for the UAV. The UAS controller generates control signals causing the UAV to execute its prescribed monitored flight path. In the course of the monitored flight, the UAS controller acquires actual surveillance quality data along the flight path. By comparing the actual surveillance quality data to the predetermined surveillance quality models, the UAS controller identifies deviations in surveillance quality. If the identified surveillance quality deviation exceeds a threshold, the UAS controller directs the UAV to execute corrective maneuvers.

In some embodiments, the UAS controller is disposed aboard the UAV.

In some embodiments, the UAS controller is a remote UAS controller in wireless communication with the UAV.

In some embodiments, the surveillance quality deviation includes a degradation in service not included in or expected by the surveillance quality model.

In some embodiments, the degradation in surveillance service includes a complete loss of surveillance service not included in or expected by the surveillance quality model.

In some embodiments, the UAV provides and receives surveillance data via a particular surveillance channel or protocol, and the surveillance quality deviation includes a degradation in service with respect to the surveillance channel or protocol.

In some embodiments, the corrective maneuvers in the event of a surveillance quality deviation include configuring the UAV for providing and receiving surveillance data via alternative surveillance channels or protocols.

In some embodiments, the surveillance quality deviation is due to uncooperative aircraft not accounted for by the surveillance quality model.

In some embodiments, the corrective maneuvers in the event of a surveillance quality deviation include maintaining separation from the uncooperative aircraft.

In some embodiments, the surveillance quality model is based on historical surveillance quality data associated with the prescribed flight path.

In some embodiments, the corrective maneuvers in the event of a surveillance quality deviation include one or more of a position change, a heading change, an attitude change, a landing procedure, and a hover-and-hold maneuver.

In some embodiments, the UAS controller determines, subsequent to the prescribed maneuvers, that the surveillance quality deviation no longer exceeds a threshold, and generates control signals causing the UAV to terminate the corrective maneuvers and resume its monitored flight path.

In some embodiments, the UAS controller modifies one or more surveillance quality models based on the actual surveillance quality data acquired (e.g., if the actual surveillance quality data is of higher quality than the surveillance quality model).

A method of operating an unmanned aerial vehicle (UAV) is also disclosed. In embodiments, the method includes acquiring surveillance quality models for portions or segments of a monitored flight of the UAV along a route or flight plan. The method includes generating control signals causing the UAV to execute the monitored flight according to the flight plan. The method includes, during the course of the monitored flight, acquiring actual surveillance data along the planned route. The method includes identifying deviations in surveillance quality by comparing the actual surveillance data to the corresponding surveillance quality models. The method includes, if the deviation in surveillance quality exceeds a quality threshold, generating additional control signals directing the UAV to execute corrective maneuvers.

In some embodiments, the method includes determining, subsequent to the prescribed maneuvers, that the deviation in surveillance quality no longer exceeds the quality threshold, and generating control signals directing the UAV to terminate the corrective maneuvers and resume its monitored flight along the planned route.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Operation of unmanned aerial vehicles (UAV) beyond visual line of sight (BVLOS) requires continuous surveillance of the UAVs (e.g., positions, headings, flight plans) to ensure deconfliction from other proximate aircraft and prevent, e.g., incursions or collisions. Broadly speaking, embodiments of the inventive concepts disclosed herein are directed to systems and methods for ensuring that unmanned aerial vehicles (UAV) do not inadvertently depart from surveillance coverage inflight. While to an extent surveillance coverage over a given flight path can be modelled, actual performance of surveillance system elements inflight may deviate from the expected performance. For example, surveillance modeling may be inaccurate, or unforeseen network faults may impair performance resulting in inadequate coverage.

Patent application Ser. No. 16/704,742, which is incorporated herein in its entirety, addresses the need to prevent a UAV from inadvertently losing a command and control (C2) link inflight. However, UAV surveillance includes a dimension of mutuality not necessarily applicable to C2 traffic. For example, high quality surveillance ensures not only that the UAV can "see" proximate traffic (e.g., is aware of the positions and headings of said proximate traffic, so as to maintain safe separation therefrom) but that the other traffic can also "see" the UAV in turn, e.g., are aware of its position, heading, etc. for the same reasons. Ensuring continuous surveillance protects not only the UAV but every other aircraft operating proximate to its flight path or within its operating space.

It is contemplated herein that embodiments of the inventive concepts disclosed herein may enable safer, more responsible beyond visual line of sight (BVLOS) operations of the UAV 106. In particular, the UAS 100 of the present disclosure may prevent the UAV 106 from exceeding surveillance coverage and inadvertently encroaching on the space of, or colliding with, another proximate aircraft. By further enabling other, proximate air traffic to "see", and maintain safe separation from, the UAV 106, embodiments of the inventive concepts disclosed herein may enable more sophisticated, safe, and reliable unmanned aerial systems. It is contemplated herein that the UAS 100 disclosed herein may provide a robust, controlled safety net for future UAS flight authorization.

Figure 1:
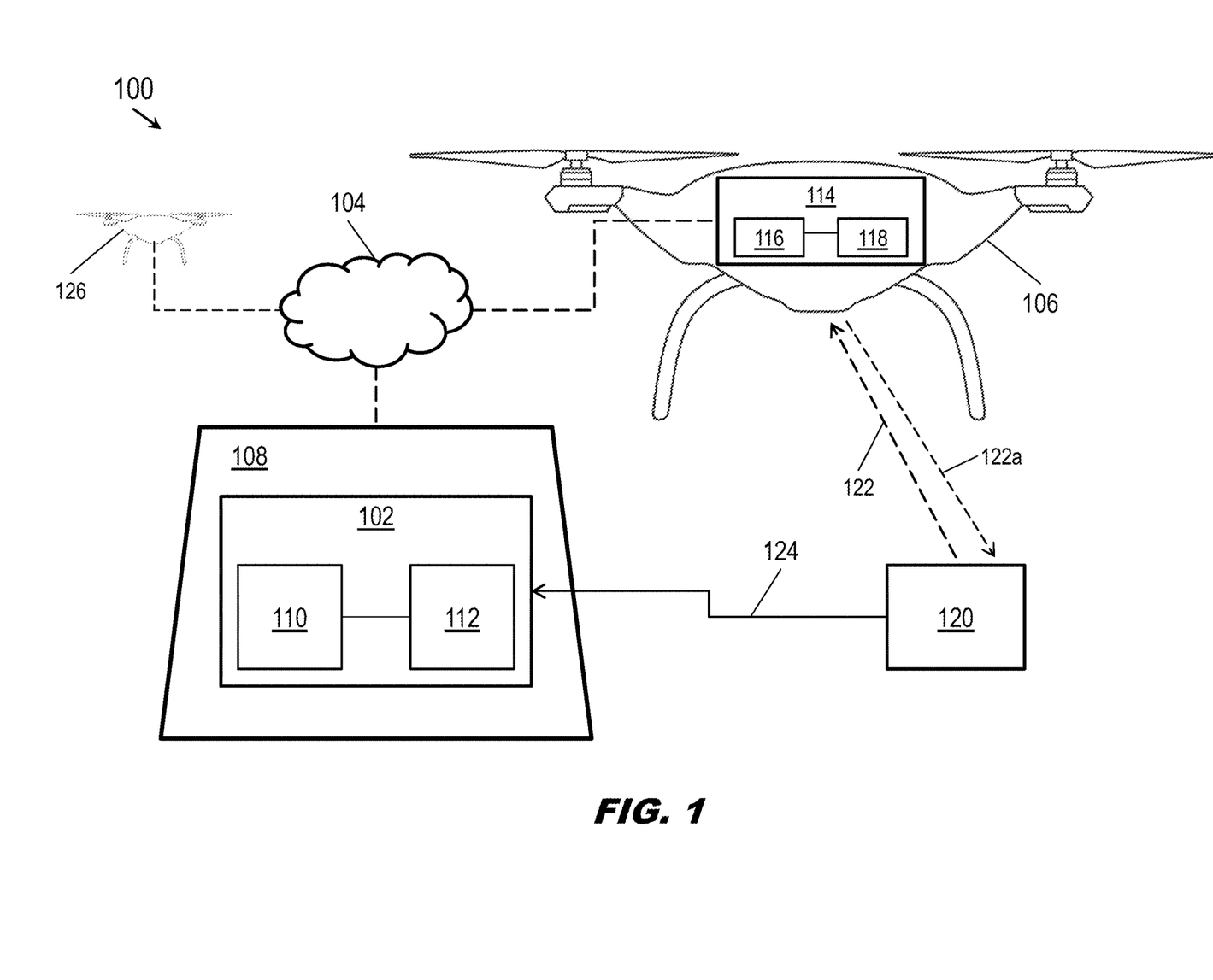
FIG. 1 illustrates a simplified block diagram view of an unmanned aerial system (UAS), according to one or more embodiments of the present disclosure.

Referring now to FIG. 1, an unmanned aircraft system 100 (UAS; e.g., operating environment for one or more unmanned aerial vehicles (UAV)) is disclosed. The UAS may include, but is not limited to, a UAS controller 102, a network 104, and one or more UAVs 106.

In embodiments, the UAS controller 102 may be communicatively coupled to one or more UAVs 106 via the network 104. In embodiments, the UAS controller 102 may be positioned remotely with respect to the one or more UAVs 106. For example, as shown in FIG. 1, the UAS controller 102 may be positioned within a ground control station 108 such that the UAS controller 102 is wirelessly communicatively coupled to the one or more UAVs 106 via the network 104. It is noted herein, however, the ground control station 108 is provided solely for illustrative purposes, and is not to be regarded as a limitation of the present disclosure, unless noted otherwise herein. In this regard, it is contemplated herein that the UAS controller 102 may be positioned within any ground control station 108, operation center, mobile control station, airborne control station, or the like. By way of another example, the UAS controller 102 may include a mobile device including, but not limited to, hand-held user interface, tablet, smart phone, and the like.

In embodiments, the UAS controller 102 may include one or more processors 110 and a memory 112. The one or more processors 110 may be configured to execute a set of program instructions stored in memory 112, the set of program instructions configured to cause the one or more processors 110 to carry out various steps/functions of the present disclosure. For example, as will be described in further detail herein, the processors 110 of the UAS controller 102 may be configured to maintain command and control (C2) over the one or more UAVs 106. In this regard, the processors 110 of the UAS controller 102 may be configured to generate one or more control signals configured to cause the UAVs 106 to perform various tasks, functions, and/or prescribed flight plan maneuvers.

In embodiments, the UAS controller 102 may be communicatively coupled to the one or more UAVs 106 in any manner known in the art. For example, the UAS controller 102 may be directly coupled to the UAVs 106 such that signals may be transmitted directly between the UAVs 106 and the UAS controller 102. By way of another example, the UAS controller 102 may be communicatively coupled to the one or more UAVs 106 via the network 104. In embodiments where the UAS 100 includes a network 104, the UAS controller 102 and UAVs 106 may each include network interface circuitry configured to interface with the network 104. As will be described in further detail herein, the network 104 may include any network known in the art. For example, the network 104 may include, but is not limited to, a network of terrestrial communication nodes (e.g., communication towers), a network of mobile communication nodes (e.g., mobile terrestrial communication nodes, mobile airborne communication nodes), and the like. It is further noted herein that the UAS controller 102 and UAVs 106 may be directly and/or indirectly (via network 104) communicatively coupled to one another via any communication protocols known in the art including, but not limited to, GSM, GPRS, CDMA, EV-DO, EDGE, WiMAX, 3G, 4G, 4G LTE, 5G, WiFi protocols, radio frequency (RF), LoRa, and the like. For example, the UAS controller 102 and UAVs 106 may transmit data between each other, directly and/or via network 104, utilizing the L-band or C-band. For instance, the UAS 100 may transmit data between the various components of the UAS 100 utilizing signals in the range of 450 mHz-5 GHz. It is noted herein that signals transmitted within UAS 100 may utilize any frequency or range of frequencies known in the art.

In embodiments, the one or more UAVs 106 may include any unmanned aerial vehicle known in the art including, but not limited to, civilian drones, commercial drones, military drones, transport drones, and the like. In embodiments, the UAVs 106 may include an onboard controller 114. The onboard controller 114 of the UAV 106 may include one or more processors 116 and a memory 118. The one or more processors 116 may be configured to execute a set of program instructions stored in memory 118, the set of program instructions configured to cause the one or more processors 116 to carry out various steps/functions of the present disclosure. For example, the onboard controller 114 may be configured to receive control commands from the UAS controller 102, and perform one or more tasks, functions, or flight maneuvers in response to the received control commands.

The memory 112, 118 may include any storage medium known in the art suitable for storing program instructions executable by the associated one or more processors 110, 116 and the data generated/received by the UAS 100. For example, the memory 112, 118 may include a non-transitory memory medium. For instance, the memory 112, 118 may include, but is not limited to, a read-only memory (ROM), a random-access memory (RAM), a magnetic or optical memory device (e.g., disk), a magnetic tape, a solid-state drive and the like. In another embodiment, the memory 112, 118 is configured to store data including, but not limited to, surveillance quality models, acquired actual surveillance quality data, and the like. It is further noted that memory 112, 118 may be housed in a common controller housing with the one or more processors 110, 116. In an alternative embodiment, the memory 106, 116 may be located remotely with respect to the physical location of the processors 110, 116, UAS controller 102/onboard controller 114, and the like. In another embodiment, the memory 112, 118 maintains program instructions for causing the one or more processors 106, 110 to carry out the various steps described through the present disclosure.

It is noted herein that various steps/functions of the present disclosure may be performed by the UAS controller 102 and/or the onboard controller 114, unless noted otherwise herein. In this regard, various steps/functions carried out within the UAS 100 may be agnostic with respect to the physical location that those steps/functions are carried out, unless noted otherwise herein. Accordingly, various steps/functions carried out by the UAS 100 may be generally described as being carried out by the UAS controller 102 and/or onboard controller 114.

In embodiments, the UAS controller 102 may provide surveillance of, and for, the UAV 106 via any combination of cooperative and non-cooperative surveillance systems. For example, in a cooperative (e.g., dependent) surveillance capacity, the UAS controller 102 may communicate with the UAV 106 to determine position information of the UAS (e.g., via transponder signals, automated dependent surveillance-broadcast (ADS-B) messages, or other signals generated and/or sent by the onboard controller 114). In a non-cooperative (e.g., dependent) surveillance capacity, radar systems 120 may locate the UAV 106 by transmitting radar signals 122 that reflect off the UAS (122a) and provide the radar systems with position information of the UAS relative to the ground, which position information may be transmitted (124) to the UAS controller 102.

In embodiments, the UAS controller 102 may similarly monitor the position information of other proximate aircraft 126 relative to the UAV 106. For example, proximate aircraft 126 may include other UAVs or manned aircraft operating within the coverage space of the UAS controller 102. For example, as the UAV 106 and proximate aircraft 126 may rely on different primary surveillance systems (e.g., radar systems 120, ADS-B), the UAS controller 102 may fuse disparate streams of surveillance data into a coherent assessment of all air traffic operating proximate to the UAS 106 or along its predetermined flight path.

Figure 2:
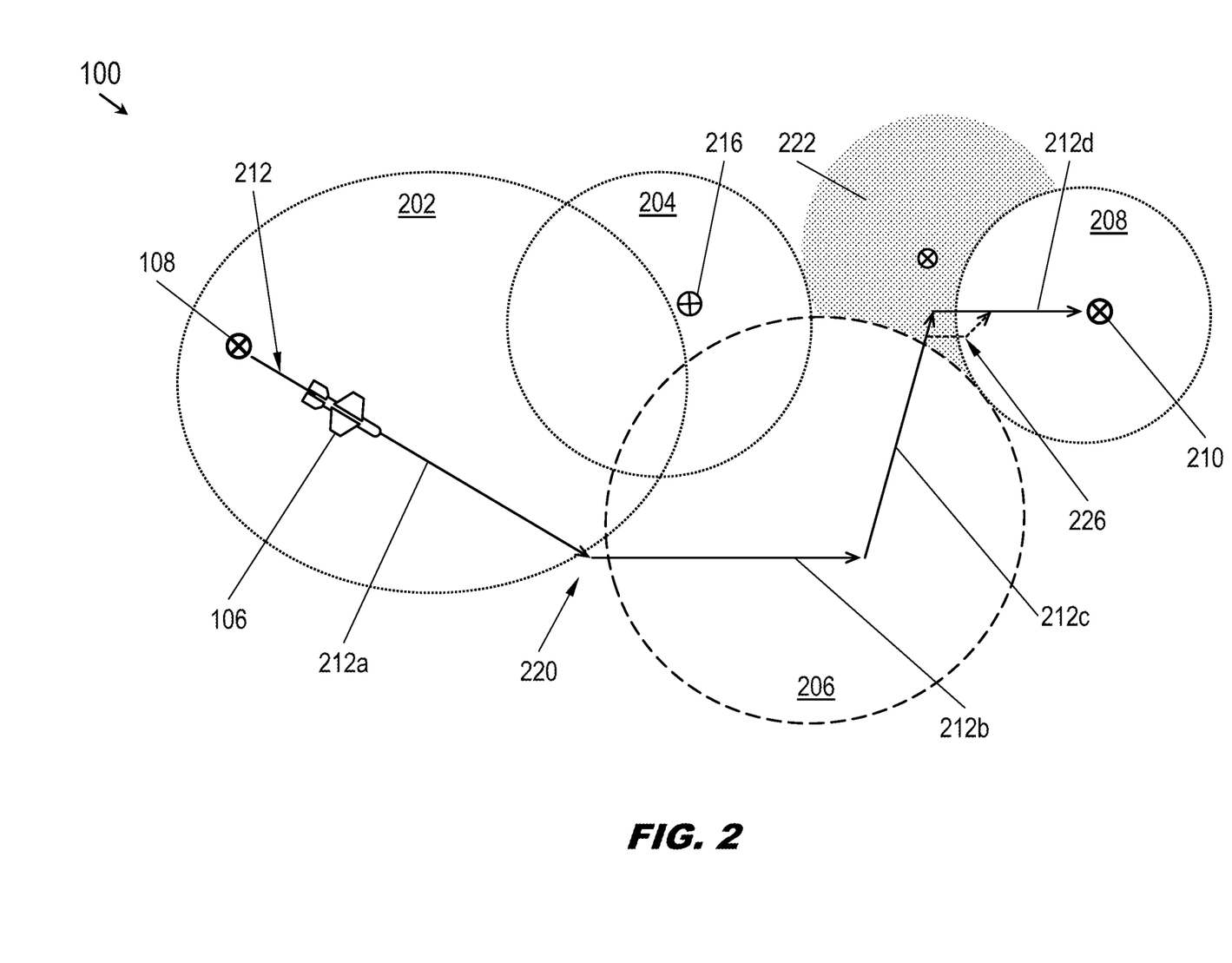
FIG. 2 is a diagrammatic illustration of an operating environment of the UAS of FIG. 1.

Referring to FIG. 2, the UAS 100 is disclosed. The UAS 100 may include, in addition to the UAV 106, surveillance regions 202, 204, 206, and 208.

In embodiments, the UAV 106 may perform or execute a monitored flight from a point of origin (e.g., the ground control station 108) to a destination 210. For example, the monitored flight may comprise a flight path 212 of sequential flight segments 212a-d, and may be generated by the UAS controller (102, FIG. 1, and/or the onboard controller 114) for filing with appropriate regulatory and/or traffic control authorities. The UAS controller 102 may direct the UAV 106 along the flight path 212 by generating command and control (C2) signals and transmitting the C2 signals to the UAV, the C2 signals including control commands configured to cause the UAV (e.g., via the onboard controller 114) to execute one or more prescribed flight plan maneuvers. For example, the one or more prescribed flight plan maneuvers may include any flight maneuvers known in the art including, but not limited to, a backtracking maneuver (e.g., backtracking along the flight path 212), a homing maneuver (e.g., returning to the ground control station 108), a hover-and-hold maneuver, a climb-and-hold maneuver, a change in position, a change in attitude (e.g., orientation with respect to one or more rotational axes), a change in heading, and the like. Program instructions for the prescribed flight plan maneuvers may be stored in memory (112, 118; FIG. 1).

In embodiments, the UAS controller 102 and/or onboard controller 114, in generating a flight plan for the UAV 106, may similarly generate a surveillance quality model corresponding to the flight path 212. For example, each of the surveillance regions 202, 204, 206, 208 may include ground control stations (216) or similar facilities configured to manage air traffic (e.g., manned or unmanned) within its associated surveillance region. In embodiments, the ground control stations 216 may communicate with the UAS controller 102 and/or onboard controller 114 as the UAV 106 executes a flight plan to track the position of the UAV (e.g., relative to its prescribed flight path 212 and/or to other aircraft).

In embodiments, the UAS controller 102 and/or onboard controller 114 may generate the flight path 212 to ensure that the UAV 106 remains within the scope of reliable and/or predictable surveillance services to the greatest extent possible. For example, the UAS controller 102 and/or onboard controller 114 may review historical surveillance data stored to memory (112/118) and determine that the surveillance regions 202, 206, 208 are associated with reliable and/or high quality surveillance service while the surveillance region 204 (as reflected by prior flight plans traversing the surveillance region 204) may be associated with less reliable surveillance (e.g., due to uneven terrain affecting coverage). Accordingly, the flight path 212 may be designed to direct the UAV 106 through the surveillance regions 202, 206, 208 while avoiding the surveillance region 204. In some embodiments, the flight path 212 of the UAV 106 may be directed through intersection regions 218, where one or more surveillance regions may overlap and surveillance coverage may be redundant. Similarly, the surveillance regions 202, 204, 208 may be associated with one or more types of surveillance channel (e.g., ADS-B) while the surveillance region 206 may be associated with other types of surveillance channel (e.g., radar). Intersection regions 218 may provide surveillance coverage via more than one channel.

In embodiments, the UAS controller 102 and/or onboard controller 114 may incorporate into the flight plan predictive data based on anticipated conditions along the prescribed flight path 212. Anticipated conditions may include, but are not limited to, anticipated noise/interference along the flight path 212, anticipated network traffic along the flight path 212, anticipated weather conditions along the flight path 212, anticipated terrestrial obstructions, anticipated jamming, and the like. For example, the flight segments 212a-b may briefly direct the UAV 106 through a blackout zone 220, or a geographical area between the surveillance regions 202, 206 but not within either coverage zone. While the prescribed flight path 212, in particular the flight segments 212a-b and the transition therebetween, may result in the UAV 106 temporarily disappearing from surveillance coverage due to the blackout zone 220 (e.g., a planned loss of surveillance services), the UAS controller 102 and/or onboard controller 114 may predict a rapid return to coverage (e.g., due to the reliability of the surveillance region 206) and thereby justify the routing of the flight path 212 through the blackout zone.

In some embodiments, the UAS controller 102 and/or onboard controller 114 may be configured to selectively modify one or more characteristics of the surveillance quality model based on actual surveillance quality data acquired during the monitored flight. For example, if the actual surveillance quality data acquired during the monitored flight is better than expected, the UAS controller 102 and/or onboard controller 114 may be configured to selectively modify one or more characteristics of the surveillance quality model to reflect the improved surveillance quality experienced by the UAV 106.

In embodiments, as the UAV 106 traverses the prescribed flight path 212, the UAS controller 102 and/or onboard controller 114 may continually monitor actual surveillance quality compared to the surveillance quality predicted by the flight plan. For example, the UAS controller 102 and/or onboard controller 114 may note the disappearance of the UAV 106 within the blackout zone 220 (e.g., after departing the surveillance area 202) and the reappearance of the UAV within the surveillance area 206 (e.g., per the flight segment 212b). While the disappearance of the UAV 106 from surveillance coverage may not represent objectively high-quality surveillance, the UAS controller 102 and/or onboard controller 114 may compare the duration of disappearance to the predicted duration of disappearance as provided for by the flight plan. Any actual deviation from the predicted duration, whether shorter or longer, may be noted by the UAS controller 102 and/or onboard controller 114 (e.g., and stored for integration into future flight planning as historical surveillance data).

In embodiments, any deviation from predicted surveillance conditions significant enough to meet or exceed a threshold may result in corrective action on the part of the UAS controller 102 and/or onboard controller 114 to minimize the risk of (or prevent) the UAV 106 inadvertently entering a blackout zone 220 (e.g., as opposed to prescribed flight therethrough according to predicted parameters). For example, the flight path 212 (in particular, flight segments 212c-d) may direct the UAV 106 through a region (222) associated with an unplanned degradation of surveillance services (e.g., a partial or total loss of surveillance coverage (e.g., surveillance outage) due to equipment failure at a ground station 224 within the region 222).

In embodiments, the UAS controller 102 and/or onboard controller 114 may respond to an anomalous deviation in surveillance quality (e.g., relative to the surveillance quality model) by directing the UAV 106 to execute one or more corrective maneuvers (e.g., dynamic rerouting maneuvers). For example, the UAS controller 102 and/or onboard controller 114 may transmit C2 signals to the UAV 106 causing the UAV to divert (226) from the flight segment 212d in order to return to reliable surveillance coverage (e.g., the surveillance region 208) as quickly as possible. In embodiments, once the UAV 106 has been established within the surveillance region 208, the UAS controller 102 and/or onboard controller 114 may transmit C2 signals to the UAV directing it to resume the prescribed flight segment 212d toward the destination 210.

Figure 3:
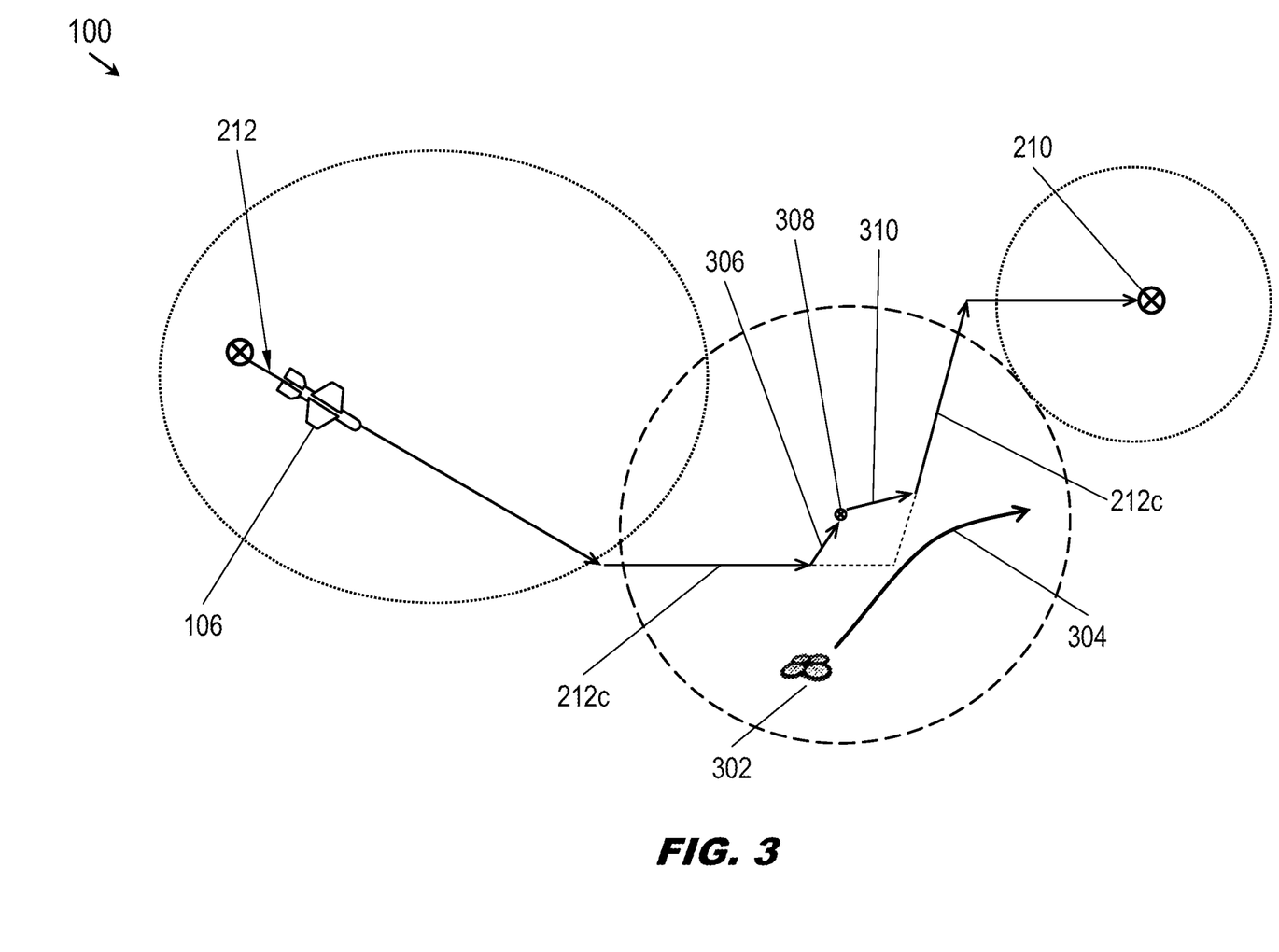
FIG. 3 is a diagrammatic illustration of an operating environment of the UAS of FIG. 1.

Referring now to FIG. 3, the UAS 100 is disclosed.

In embodiments, the UAS controller (102, FIG. 1)/onboard controller (114, FIG. 1) may generate a flight plan and surveillance quality model configured to account for historical, known, and/or predicted air traffic patterns (e.g., manned or unmanned) and provide for the UAV 106, to the greatest extent possible, both 1) adequate separation from any proximate air traffic (e.g., as required by applicable regulations) and 2) surveillance visibility of the UAV to the proximate air traffic.

In embodiments, significant deviations in actual surveillance quality from the surveillance quality model incorporated into the flight plan of the UAV 106 may be associated with the presence of non-cooperative or unplanned proximate air traffic along the flight path 212. For example, the UAV 106, while executing the flight segment 212*b*, may encounter a proximate aircraft 302 not accounted for by the surveillance quality model, and whose trajectory 304 may result in an incursion or collision if not resolved.

In embodiments, the UAS controller 102 and/or onboard controller 114 may respond to the detection of the proximate aircraft 302 by generating and transmitting control signals to the UAV 106 causing the UAV to execute one or more corrective maneuvers. For example, the UAV 106 may be directed to divert (306) from the flight segment 212*b* to a waypoint 308, over which the UAV 106 may be directed to hover-and-hold until the proximate aircraft 302 no longer causes a deviation in surveillance quality (e.g., no longer represents a potential incursion or collision). The UAS controller 102 and/or onboard controller 114 may, at a subsequent point, determine that the deviation between actual surveillance quality and the surveillance quality model is no longer anomalous or significant, and direct the UAV 106 to resume (310) the flight path 212 (e.g., the flight segment 212*c*) toward the destination 210.

FIG. 4A/B—METHOD

Figure 4A:
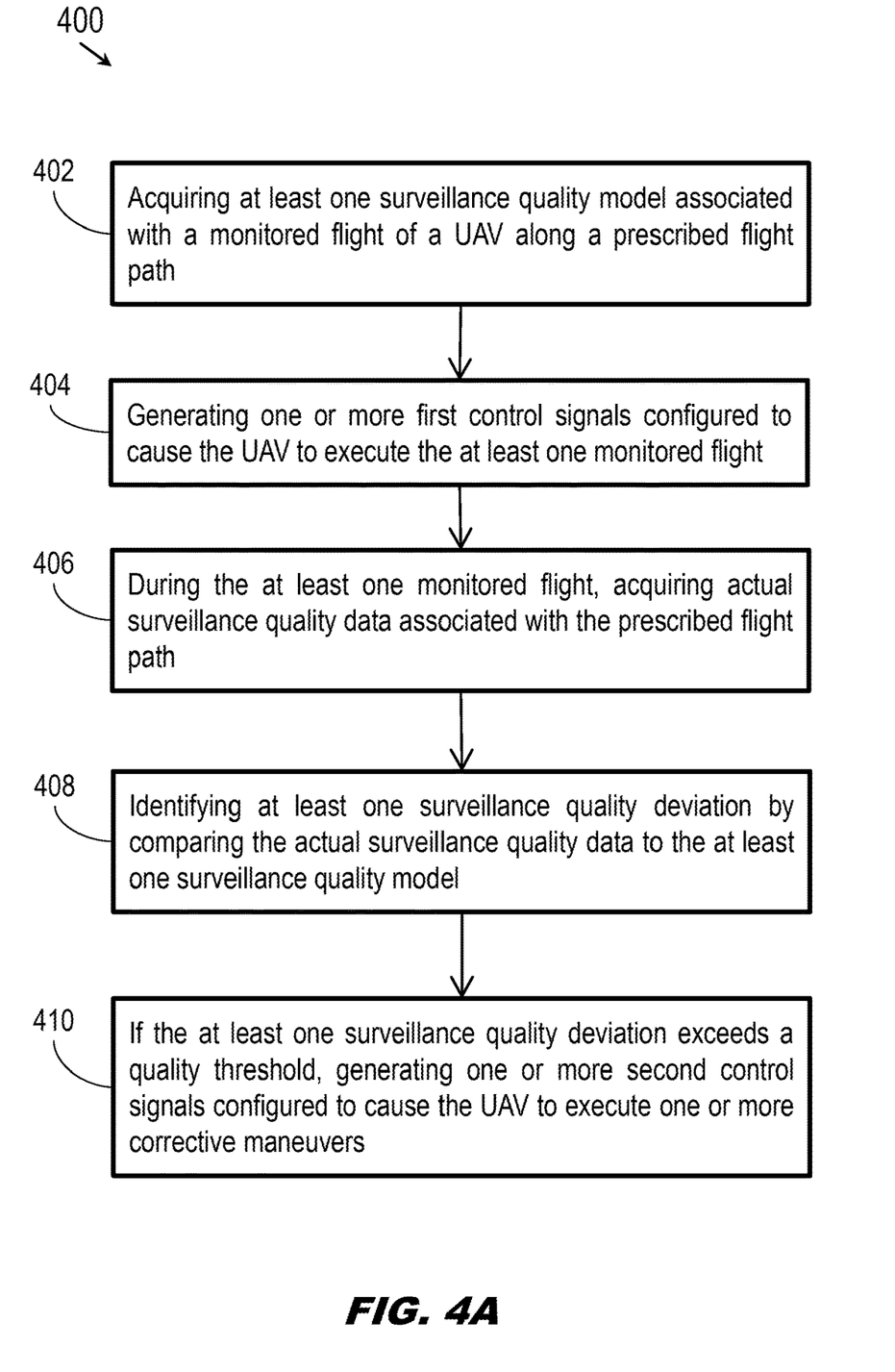
FIGS. 4A and 4B illustrate a flowchart of a method for operating an unmanned aerial vehicle (UAV) according to one or more embodiments of the present disclosure.

Referring to FIG. 4A, a method 400 for operating an unmanned aerial vehicle (UAV) is disclosed. The method 400 may be implemented by the UAS 100 and/or the UAV 106 and may include the following steps.

At a step 402, the UAS controller/UAV onboard controller acquires a surveillance quality model for a monitored flight along a prescribed flight path. For example, the surveillance quality model may be based on historical flights along the flight path or may include predictive data based on anticipated conditions along the flight path. In some embodiments, the surveillance quality model may be a component of flight plan generated for the UAV by the UAS controller/UAV onboard controller.

At a step 404, the UAS controller/UAV onboard controller generates control signals causing the UAV to execute the monitored flight. For example, the control signals may cause the UAV to ascend/takeoff, descend/land, change position or heading, or execute other prescribed maneuvers in furtherance of the flight plan.

At a step 406, the UAS controller/UAV onboard controller acquires actual surveillance data as the UAV traverses the prescribed flight path. For example, the actual surveillance data may reflect surveillance coverage conditions which may be anticipated by the flight plan, or which may affect surveillance quality in such a way (e.g., beneficially or adversely) as to deviate from the surveillance quality mode.

At a step 408, the UAS controller/UAV onboard controller identifies deviations in surveillance quality by comparing the actual surveillance quality data to the surveillance quality model for the prescribed flight path. For example, deviations in surveillance quality may include partial or total service degradations where no degradation in surveillance quality is anticipated, or non-cooperative air traffic not anticipated by the surveillance quality model.

At a step 410, if the surveillance quality deviation exceeds a quality threshold, the UAS controller/UAV onboard controller generates additional control signals to cause the UAV to execute one or more corrective maneuvers. For example, the UAV may be directed to change position or heading, e.g., to evade non-cooperative traffic or fly to an area of more reliable surveillance.

Figure 4B:
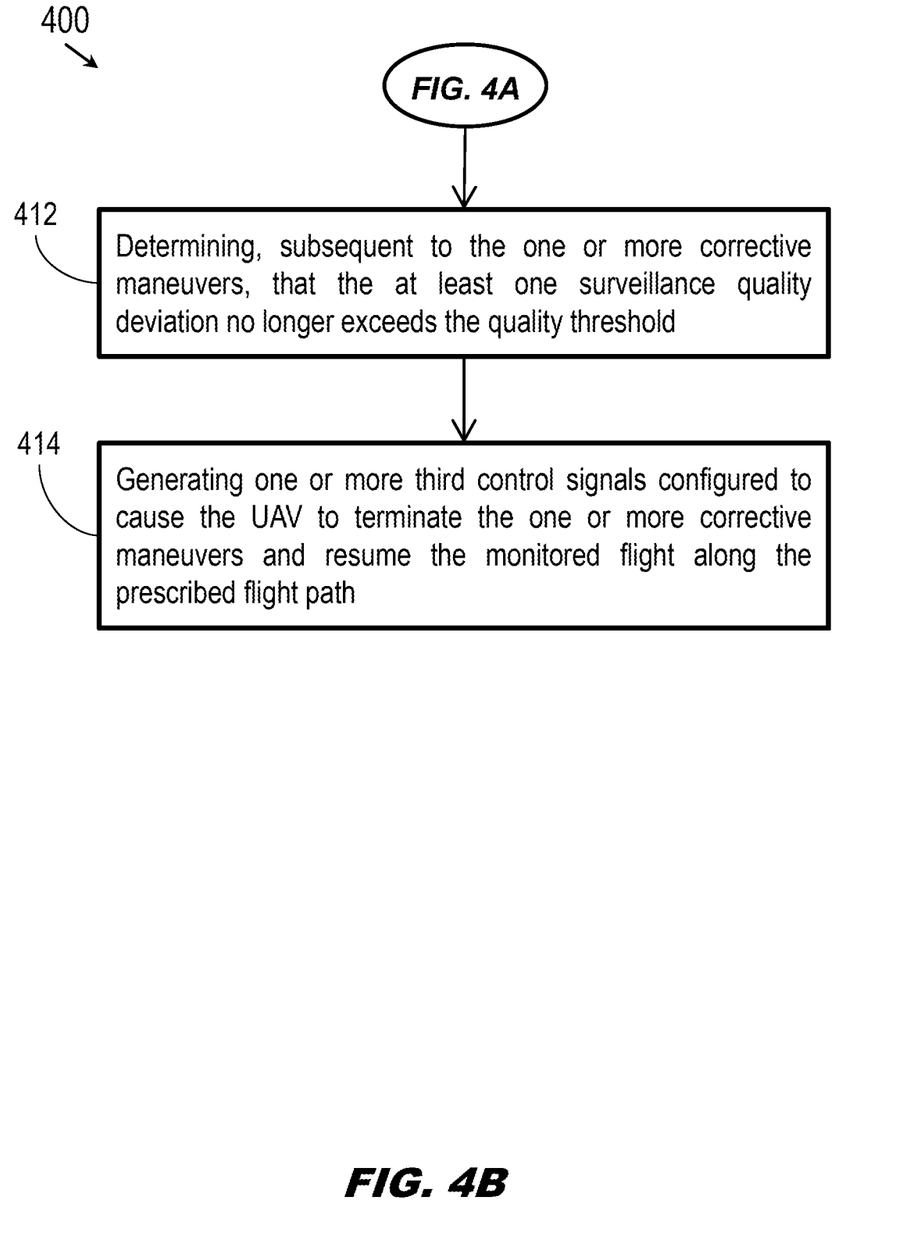

Referring also to FIG. 4B, the method 400 may include the additional steps 412 and 414. At the step 412, the UAS controller/UAV onboard controller subsequently determines that the surveillance quality deviation no longer exceeds the quality threshold. For example, the UAV may evade detected uncooperative traffic, hover and hold until said uncooperative traffic is no longer proximate, or fly to a region where surveillance quality is no longer degraded.

At the step 414, the UAS controller/UAV onboard controller generates further control signals causing the UAV to terminate any corrective maneuvers due to the detected surveillance quality deviation and resume its monitored flight along the prescribed flight path.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An unmanned aircraft system (UAS), comprising:
   an unmanned aerial vehicle (UAV);
   and
   at least one UAS controller communicatively coupled to the UAV, the UAS controller including one or more processors configured to execute a set of program instructions stored in memory, the set of program instructions configured to cause the one or more processors to:
   acquire at least one surveillance quality model associated with a monitored flight of the UAV along a prescribed flight path;
   generate one or more first control signals configured to cause the UAV to execute the at least one monitored flight;
   during the at least one monitored flight, acquire actual surveillance quality data associated with the prescribed flight path;
   identify at least one surveillance quality deviation by comparing the actual surveillance quality data to the at least one surveillance quality model;
   and if the at least one surveillance quality deviation exceeds a quality threshold, generate one or more second control signals configured to cause the UAV to execute one or more corrective maneuvers.

2. The UAS of claim 1, wherein the UAS controller is positioned onboard the UAV.

3. The UAS of claim 1, wherein the UAS controller comprises a remote UAS controller wirelessly coupled to the UAV.

4. The UAS of claim 1, wherein:
the at least one surveillance quality deviation is associated with at least one service degradation not corresponding to the at least one surveillance quality model.

5. The UAS of claim 4, wherein the service degradation includes a complete loss of surveillance quality not corresponding to the at least one surveillance quality model.

6. The UAS of claim 1, wherein:
the UAV is configured for at least one of providing and receiving surveillance data via a first surveillance channel;
and
the at least one surveillance quality deviation is associated with a service degradation of the first surveillance channel.

7. The UAS of claim 6, wherein the one or more corrective maneuvers include configuring the UAV for the at least one of providing and receiving surveillance data via at least one second surveillance channel.

8. The UAS of claim 1, wherein:
the at least one surveillance quality deviation is associated with at least one uncooperative aircraft not corresponding to the at least one surveillance quality model.

9. The UAS of claim 8, wherein the one or more corrective maneuvers are associated with maintaining separation from the at least one uncooperative aircraft.

10. The UAS of claim 1, wherein the surveillance quality model is based on historical surveillance quality data associated with the prescribed flight path.

11. The UAS of claim 1, wherein the one or more corrective maneuvers include at least one of a position change, a heading change, an attitude change, a landing procedure, and a hover-and-hold maneuver.

12. The UAS of claim 1, wherein the UAS controller is configured to:
determine, subsequent to the one or more corrective maneuvers, that the at least one surveillance quality deviation no longer exceeds the quality threshold;
and
generate one or more third control signals configured to cause the UAV to terminate the one or more corrective maneuvers and resume the monitored flight along the prescribed flight path.

13. The UAS of claim 1, wherein the UAS controller is configured to modify the at least one surveillance quality model based on the actual surveillance quality data.

14. A method of operating an unmanned aerial vehicle (UAV), the method comprising:
acquiring at least one surveillance quality model associated with a monitored flight of a UAV along a planned route;
generating one or more first control signals configured to cause the UAV to execute the at least one monitored flight;
during the at least one monitored flight, acquiring actual surveillance quality data associated with the planned route;
identifying at least one surveillance quality deviation by comparing the actual surveillance quality data to the at least one surveillance quality model;
and
if the at least one surveillance quality deviation exceeds a quality threshold, generating one or more second control signals configured to cause the UAV to execute one or more corrective maneuvers.

15. The method of claim 14, further comprising:
determining, subsequent to the one or more prescribed maneuvers, that the at least one surveillance quality deviation no longer exceeds the quality threshold;
and
generating one or more third control signals configured to cause the UAV to terminate the one or more corrective maneuvers and resume the monitored flight along the prescribed flight path.

* * * * *